Sept. 20, 1966  G. L. HARMON ET AL  3,274,552
ADAPTIVE MISSILE CONTROL SYSTEM

Filed June 25, 1962  5 Sheets-Sheet 1

INVENTOR
GEORGE LAMAR HARMON
WILLIAM O. PURCELL

BY *Julian C. Denero*
ATTORNEY

Sept. 20, 1966 G. L. HARMON ET AL 3,274,552
ADAPTIVE MISSILE CONTROL SYSTEM
Filed June 25, 1962 5 Sheets-Sheet 2
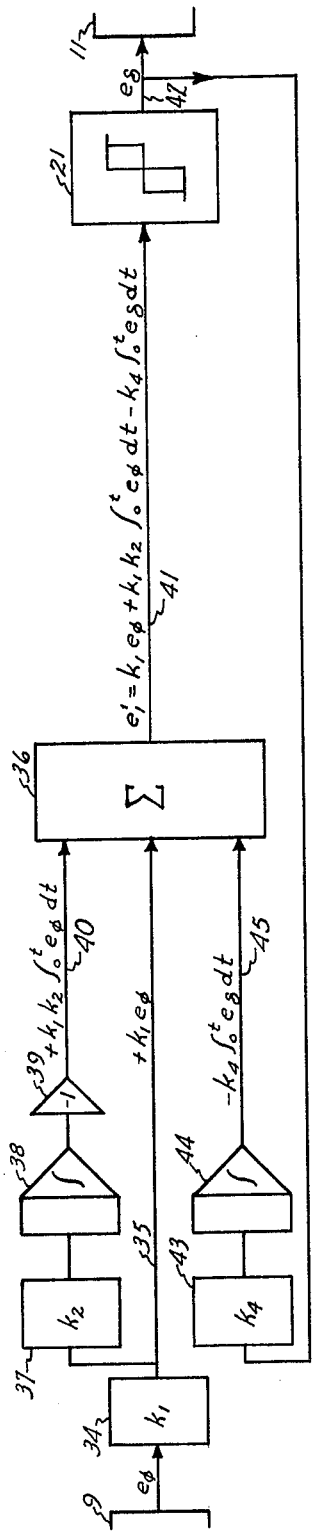
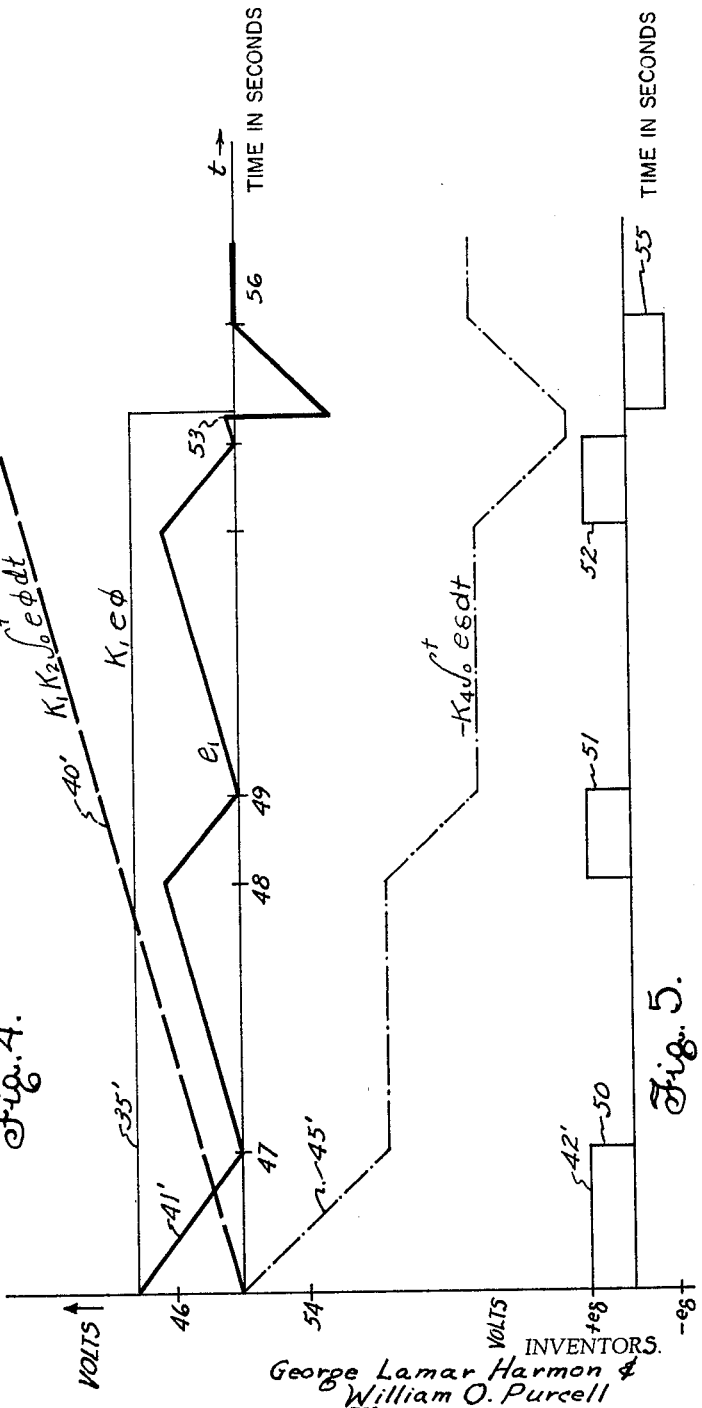
INVENTORS.
George Lamar Harmon &
William O. Purcell
BY
Julian C. Renfro
ATTORNEY United States Patent Office 3,274,552
Patented Sept. 20, 1966

3,274,552
ADAPTIVE MISSILE CONTROL SYSTEM
George Lamar Harmon and William O. Purcell, Orange County, Fla., assignors to Martin-Marietta Corporation, Middle River, Baltimore, Md., a corporation of Maryland
Filed June 25, 1962, Ser. No. 204,875
13 Claims. (Cl. 340—147)

This invention relates to control systems, and particularly to an adaptive controller. The invention contemplates a system for controlling, for example, a moving object to move along a desired path, wherein the system adapts itself to the environment by accumulating information derived from control signals and utilizing such information to effect subsequent control signals.

The invention is specifically useful in a system for remote control of a guided missile, such as a missile launched from a manned aircraft toward a specific visible target and thereafter controlled in flight by the pilot or other personnel on the aircraft. The person in control may operate a miniature joy stick to generate up, down, right or left control signals, depending upon the sighted departure of the missile from its desired path to the target. These signals are processed in the control system and the resultant signals produced in the system are transmitted as by radio to the missile to cause displacement of aerodynamic reaction control elements, such as elevators, rudders, or spoilers, or to cause operation of other suitable path-changing devices on the missile. According to this invention the control signals produced in response to movements of the "stick" are "remembered" and subsequently utilized in the production of controlling signals transmitted to the missile.

A general object of the invention is to provide improved means for producing control signals, and particularly such signals as may be useful to control the path of movement of a moving object.

A particular object of the invention is to provide automatic means for deriving and accumulating, from input signals, data relating to or simulating the performance of a moving object, such as a guided missile, and for generating from such data, signal components for furnishing to the control mechanism of the missile or other object.

Another important object of the invention is to provide in a bang bang control system means for generating variable width pulses at variable frequency, and, particularly, pulses of a predetermined minimum width at least sufficient for the control element to be actuated by the pulse.

As used herein, "bang bang" is intended to denote a system wherein pulses actuate a control element to full limit position during the occurrence of a pulse of sufficient duration, or "width," for the actuation to take place, and wherein the actuation takes place in response to any pulse which exceeds a predetermined minimum amplitude. In other words, by this term is meant a position control system wherein control is effected by control elements having a neutral position and two opposite extreme control positions, with proportionality of control being achieved by intermittent periods of actuation of the elements to their extreme positions. In bang bang systems, accordingly, increased control effect results from any increase in pulse frequency or any increase in pulse width or duration, but the controlled device does not respond differently to pulses of different amplitudes above some predetermined minimum amplitude sufficient to produce response.

Prior art systems of the bang bang type, wherein a missile or other object has been provided with relays and solenoids for momentary or brief operation of course-changing control elements from neutral to full limit position and return, having included manually operated switches by means of which the operator could send discrete commands to actuate the control elements. In certain systems, the missile solenoid would be energized for the period of closure of the corresponding manual switch. In other systems, the switch might control the transmission of a train of constant frequency pulses produced by an oscillator. Such pulses would have a frequency and width appropriate to movement of a control element on the missile. The pulses might have durations, for example, of one-half second and a repetition rate of the same order of magnitude. An input from the operator might result in the immediate transmission of a pulse or might cause transmission of a pulse only after substantial delay depending upon the state of the oscillator at the time of the input from the operator. Such systems, therefore, gave only random access of the operator to the pulse train.

A specific object of this invention is to provide a system wherein the operator has immediate access to the pulse train.

Within the compass of the general objects of the invention in a bang bang system to improve the response of the system, to reduce the burdens upon the operator and to increase the accuracy with which the operator can provide control inputs and the accuracy or precision with which the system responds, are these specific objects, to provide control which is to a large extent proportional rather than merely on-off, to provide in the system means to generate controlling signals which, being derived from a memory of the previous manual stick movements, anticipate the signals which the operator would otherwise have to originate, whereby the operator, following a short period after he assumes control, is required only to originate trim commands, to provide in the system means for causing the first control element actuation responsive to stick movement to be substantially immediate and correspond as to length of time of such first actuation to the extent and rapidity of the stick movement, to provide means for checking previous commands more or less completely as determined by the rapidity with which the stick is moved in the direction to overcome the previous commands, and to so arrange the system that, even if it has been necessary to apply corrections in one direction to the missile repeatedly, at one time is the stick so far displaced in any direction that further commands cannot be initiated nor is the system so loaded as to be unable to respond to such further commands.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 4 is an analog diagram of portions of a system embodying concepts according to certain aspects of the invention;

FIG. 5 is a graphical representation of voltages explanatory of the operation of the arrangement of FIG. 4;

Figure 1:
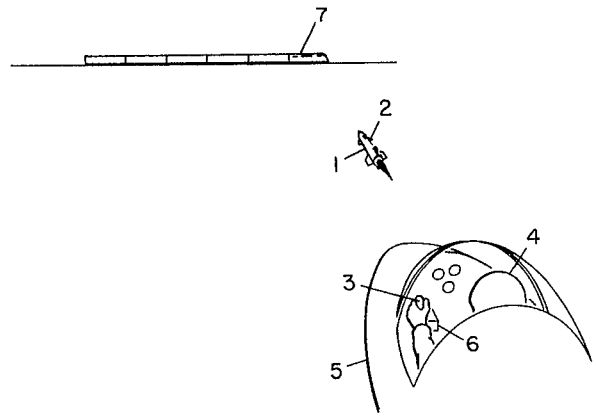
FIG. 1 is an illustration of a missile control system of one type in which the invention is useful.

Referring now to FIGURE 1 of the drawings, a specific system embodying this invention may comprise a missile 1 having aerodynamic control surfaces 2 and means for remote control of the missile which may include a small stick 3 arranged for operation by the pilot 4 of an aircraft 5. The stick 3 controls suitable elements of a signal generating and transmitting apparatus indicated generally at 6 by means of which signals are transmitted to the missile to cause movements of the control surfaces. In operation, the missile 1 would, typically, be carried by the aircraft 5 to the vicinity of the prospective target, indicated as a railroad train 7; the aircraft would then be directed toward the target, and the missile launched. The aircraft is thereafter flown approximately directly toward the target, or perhaps toward a point somewhat in front of the target if the target is moving, while the pilot, by means of stick 3, attempts to control the missile into collision with the target. If the missile as sighted by the pilot is below the target, stick 3 is pulled back thereby to correct the flight path of the missile into a path or direction slightly above its path before the correction. The stick will, ordinarily, be pulled back rapidly under these circumstances and the pilot will then more slowly return the stick toward neutral as the missile begins to obey the command. The control signal transmitted as contemplated in this invention will be a series or train of pulses, each pulse being effective to move a control surface of the missile. For example, each pulse may move a spoiler outwardly from the missile to the full limit position of the spoiler and the spoiler may then return to neutral after a period determined by the width of the pulse. If the operator sights the missile as being to the right or left of target, he would move the stick left or right, and, of course, if the missile is above the target, the stick would be moved forward. With this understood, the disclosure herein will be detailed only with respect to up-down control of the missile, since right-left control is effectuated in the same manner and with equipment substantially duplicating the equipment for up-down control. It will be understood that one transmitter on the aircraft and one receiver on the missile may process both up-down and right-left signals, distinguishing between up-down and right-left signals by utilizing different carrier frequencies therefor, by time division multiplexing or in other desired ways. It will be further understood that the one stick employed in this invention controls two potentiometer sliders, one for up-down missile control and another for right-left missile control. These sliders and the respective potentiometer resistances are connected into the up-down signal generating channel and into the right-left signal generating channel, respectively. Since each potentiometer with its respective channel constitutes a complete apparatus for two-directional control, such as for up-down control, only one potentiometer and one signal generating channel will be described to avoid redundancy.

Figure 2:
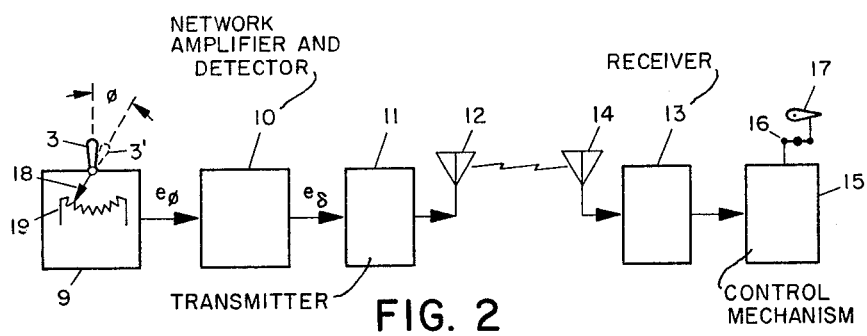
FIG. 2 is a simplified box diagram of a control system embodying the invention.

FIGURE 2 shows schematically a control channel from stick 3 to missile spoiler 17. It will be taken that this is the vertical control channel. The system comprises a device 9 for producing a D.C. input voltage $e_\phi$ variable typically from −28 v. to +28 v. in accord with manual operation of stick 3, a network, amplifier and detector arrangement 10 for deriving and combining various functions of the manually provided signal $e_\phi$ and for summing such functions and for providing an output signal to be transmitted to the missile, a transmitter 11 connected for keying or modulation by the output signal, and an antenna 12 for the transmitter, these components being arranged on the aircraft. The system further includes on the missile a receiver 13 and receiving antenna 14, a control mechanism 15 connected for actuation to the receiver, and a linkage 16 mechanically connecting the spoiler 17 for actuation by the control mechanism 15.

As indicated schematically, the stick 3 may operate a slider 18 along a potentiometer voltage divider resistance element 19, giving a null or zero voltage when the stick is centered as shown in solid lines, or giving an "up" signal when operated through an angle $\phi$ in one direction from center, as seen, for example, in broken lines at 3', and which may correspond to a negative voltage $e_\phi$, and a "down" signal when operated in the other direction through any negative angle $\phi$, which may give a positive voltage $e_\phi$.

Figure 3:
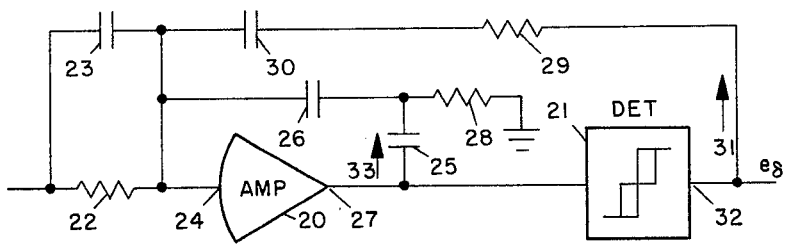
FIG. 3 is a schematic diagram illustrative of the invention.

The general nature of the arrangement identified at 10 in FIG. 2 is shown in simplified schematic form in FIG. 3. The operator input voltage $e_\phi$ is subjected to double integration, single integration, amplification, the integral of a degenerative feedback signal, and summation. The arrangement includes a high gain D.C. amplifier 20, a detector 21, and passive network elements including parallel connected resistor 22 and capacitor 23 through which the input voltage is supplied to the amplifier input terminal 24, regenerative capacitors 25 and 26 connected in series between the output terminal 27 of the amplifier and input terminal 24, a resistor 28 connected from the juncture of capacitors 25 and 26 to ground, and resistor 29 and capacitor 30 connected in a degenerative feedback circuit 31 from the output terminal 32 of detector 21 to the amplifier input 24.

The network and amplifier, according to the invention, provide as the voltage $e_1$ at the amplifier output terminal the sum of voltages proportional to the input voltage $e_\phi$ and the first and second integrals of the input voltage minus a voltage proportional to the integral of the output voltage $e_\delta$. The detector is arranged to produce an output voltage $e_\delta$ only when the voltage $e_1$ exceeds a predetermined threshold value, which in an exemplary embodiment may be 1 volt. Thus when the amplifier and its associated network, including the regenerative branch 33 comprising capacitors 25 and 26 and resistor 28, produces, in response to an input voltage $e_\phi$ from the control stick, a voltage $e_1$ of 1 volt the detector is triggered and starts producing an output voltage $e_\delta$. At this time, the degenerative feedback network 31 provides a voltage back to amplifier input terminal 24 which tends to buck out the voltages there appearing. This feedback voltage increases with time. The circuit parameters are such that the feedback voltage, after a period of time depending upon the magnitude of the voltage at the amplifier input and its rate of change, will cause a reduction of the voltage $e_1$ at the amplifier output terminal 27 to a lower second threshold.

Detector 21 has hysteresis characteristics such that it is triggered into energized or active condition to produce an output voltage in response to occurrence of a voltage $e_1$ of a first threshold value of, for example, +1 volt and remains energized thereafter until the voltage $e_1$ falls to a second lower threshold value which may be, for example, 0 volts.

In response to an input voltage $e_\phi$, accordingly, the system may produce an output voltage $e_1$ sufficient to trigger the detector, whereupon degenerative voltage is fed back through branch 31 until the voltage $e_1$ is reduced to zero, and thereafter the input voltage $e_\phi$ summed with the integrals thereof competes with the degenerative feedback voltage for control of the detector causing it to oscillate between energized and deenergized conditions.

In order that the system may respond to both up and down commands, or right and left commands, the detector is arranged as a full wave, non-linear, dead band device, operative to provide an output voltage $e_\delta$ of one sign in response to triggering by a positive voltage $e_1$ and of opposite sign when triggered by a negative voltage $e_1$. The detector has a dead band in that it may be triggered when $e_1$ reaches +1 volt to produce and to continue to produce an output voltage $e_\delta$, which will be assumed to be positive, until the voltage $e_1$ falls to zero, and the detector will be triggered to produce a negative voltage $e_\delta$ when the voltage $e_1$ increases negatively from 0 to $-1$ volt and will continue in this energized condition until the negative voltage $e_1$ decreases to zero. It is important that the detector should become deenergized in one direction before becoming energized in the other direction, or, in other words, that, if the detector is energized in response to a positive voltage $e_1$, it should become deenergized as the voltage $e_1$ changes in a negative direction at a voltage $e_1$ more positive than that necessary to trigger the detector to produce a negative voltage $e_\delta$. If the thresholds for positive and negative triggering are $e_1 = +1$ volt and $e_1 = -1$ volt, respectively, then the detector, if positively energized, should become energized as $e_1$ changes negatively at a voltage for $e_1$ more positive than $-1$ volt, or, if negatively energized, it should become deenergized as $e_1$ changes positively at a voltage for $e_1$ more negative than $+1$ volt. For simplicity, it is assumed herein that the detector becomes deenergized as voltage $e_1$ reaches zero regardless of the direction of change of $e_1$.

While the memory provided in accord with this invention through the incorporation in the system of means for deriving the double integral of the input voltage is of great importance, the system may be better understood by reference first to an analog diagram wherein an input voltage $e_\phi$ is summed with the first integral of the input voltage to control a detector, and this sum is bucked by a degenerative voltage derived by integrating the detector output. Such an analog diagram is shown in FIG. 4, wherein the voltage $e_\phi$ from a stick controlled potentiometer 9 is supplied through suitable multiplying means 34 to provide a voltage $K_1 e_\phi$ on line 35 to a summer represented at 36. The voltage on line 35 is also fed to a second multiplying means 37 and thence through an integrator 38 and, if necessary, to means for reversing the sign as shown at 39, whereby a voltage $$+K_1 K_2 \int_0^t e_\phi dt$$

is produced on line 40 for supplying to summer 36 in additive relation to the voltage on line 35. The resultant voltage produced by the summer 36 and supplied on line 41 to detector 21 will comprise $$K_1 e_\phi + K_1 K_2 \int_0^t e_\phi dt$$

Such voltage on line 41 resulting from the application of voltage from the stick potentiometer would build up until sufficient to trigger detector 21, whereupon an output voltage $e_\delta$ is produced at line 42. An integral voltage is now derived from the output voltage by means of multiplier 43 and integrator 44 and this integral voltage, which may be expressed as $$-K_4 \int_0^t e_\delta dt$$

is introduced into the summer on line 45 with a sign such that it will therein degenerate or buck the voltages on lines 35 and 40.

The diagram of FIG. 4 may be further explained by reference to the chart of FIG. 5 showing voltages plotted against time $t$. When a voltage $e_\phi$ is supplied by the potentiometer 9 to the system, a voltage $K_1 e_\phi$ will appear on line 35 of FIG. 4 which is represented by curve 35' in FIG. 5. The integral of the voltage $K_1 e_\phi$, that is, $$K_1 K_2 \int_0^t e_\phi dt$$

will appear on line 40 as represented in FIG. 5 by curve 40'. If this voltage $K_1 e_\phi$ is greater than the positive threshold triggering value, represented at 46, for the detector, the detector will become energized to supply the output voltage to the integrator 44 and this to cause the voltage $$-K_4 \int_0^t e_\delta dt$$

to appear on line 45, as shown at 45' in FIG. 5. While the detector remains energized, the output voltage $e_\delta$ is supplied to the output circuit 42 as represented at 42' on the chart.

The resultant voltage appearing at the summer output and detector input line 41 is shown as curve 41' in FIG. 5.

It will be seen that the downward slope of curve 45' is greater than the upward slope of curve 40', whereby the degenerative voltage causes the summer output voltage, curve 41', to decrease until a time at 47 when this voltage reaches the deenergization threshold value for the detector. The detector, as it becomes deenergized, ceases to produce the output voltage $e_\delta$, and, of course, no increase in voltage on curve 45' thereafter occurs until an output voltage is again produced.

After time 47, accordingly, the sum of $K_1 e_\phi$, curve 35', and $$K_1 K_2 \int_0^t e_\phi dt$$

curve 40', increases, as shown by curve 41', between the times represented at points 47 and 48, at which latter time the voltage has reached the detector energizing threshold value 46. The detector then becomes energized, degenerative feedback is again initiated, and, of course, output voltage $e_\delta$ is again produced.

Since the original voltage $K_1 e_\phi$ supplied was substantially greater than the threshold value 46, the time for this voltage to be reduced to zero by the degenerative feedback up to time 47 will be greater than the period between times 48 and 49 to reduce the voltage on curve 41' to zero starting at the threshold value 46. Accordingly, the first pulse 50 of output voltage, curve 42' will be wider than the second pulse 51.

So long as the potentiometer voltage 35' remains constant, the system continues to oscillate to produce a series of equal width output voltage pulses, such as pulses 51 and 52, as the regenerative integral (summed with the stick voltage) and the degenerative integral compete for control of the detector.

The initial voltage $K_1 e_\phi$ will, usually, be much higher than the threshold 46, and if, at a time 53, the stick is abruptly centered reducing the voltage $K_1 e_\phi$ to zero, the summer output voltage 41' will abruptly decrease to a value which, will produce a resultant voltage 41' more negative than the negative triggering threshold value 54. The detector is thus triggered to provide a negative output voltage pulse as shown at 55 which continues until the time 56 when degenerative feedback now tending to reduce the negative summer output voltage results in changing this voltage in a positive direction to the deenergization value for the detector. Since there is now no voltage $e_\phi$, the voltage $e_1$ remains zero.

The negative pulse 55 will constitute a check command. If it occurs as a result of stick centering immediately following a positive pulse 52 it will be of somewhat greater width than if it results from stick centering after a greater time following a positive pulse. The operator, therefore, has something akin to random access to the system insofar as the check command is concerned, not in that the check command will be delayed after the stick is centered, for it will be immediately produced, but in that the width of the check command pulse will be greater if the stick centering occurs very shortly following a positive pulse.

The check command pulse will be somewhat narrower than the first pulse 50, since the voltage curve 40' no longer increases after the stick is centered, since centering of the stick causes the voltage $e_\phi$ to become zero. The width of the pulse 55 is substantially affected by the extent to which the initial voltage $K_1 e_\phi$ exceeds the threshold value 46, since the abrupt stick centering at time 53 has the effect of subtracting from the summer output at that moment a voltage equal to the initial value of $K_1 e_\phi$. The summer output voltage will, therefore, be driven farther below the negative threshold trigger value 54 for larger initial values of $K_1e_\phi$, the greater voltage requiring a longer time to be bucked out to zero by the degenerative feedback.

While the curves 35', 40' and 45' represent voltages which, in the case of the two latter curves, increasingly depart from zero, these voltages do not independently exist in the system but would be so combined in the summer that the resultant 41' would exist. The system makes use of a single amplifier and sums the voltages shown on the graphs at the same point, whereby the amplifier output remains small and equipment complexities are minimized.

It is to be noted that the check command pulse 55 is generated by a rapid centering of the stick. A gradual centering would decrease the slope of curve 40' and thus decrease the rate of increase of the voltage curve 41' between pulses and increase the downward slope during pulses, thereby gradually increasing the time between pulses and decreasing the duration or width of the pulses. When the stick had returned to zero, the pulses would have stopped altogether.

The check command in a guided missile system such as herein described serves the purpose of decreasing the velocity toward the line of sight of the missile. Each pulse 50, 51, 52 will accelerate the missile toward the line of sight and as the missile approaches the line of sight it is desired to reduce its accumulated velocity toward the line of sight. This, then, is the function of the opposite sign pulse 55 which would cause acceleration of the missile in a direction to reduce its velocity toward the line of sight.

It is preferred that the stick potentiometer 9 be self centering, whereby to return voltage $e_\phi$ to zero immediately the stick 3 is released.

Figure 6:
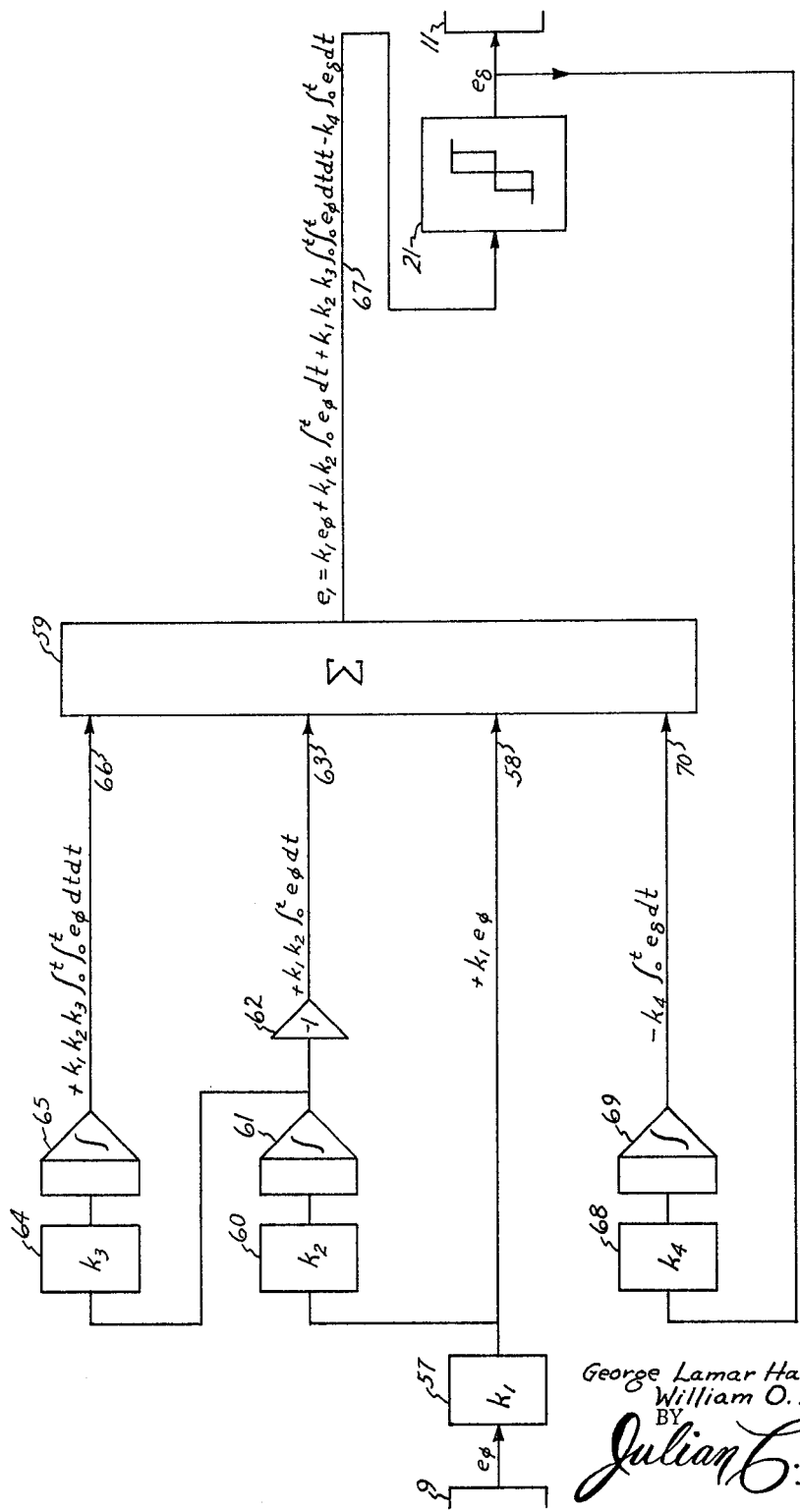
FIG. 6 is an analog diagram of portions of the system according to the preferred embodiment thereof.

FIG. 6 is an analog diagram showing a system, in accord with the invention, having memory in addition to the attributes of the system of FIG. 4. In this system, the input voltage $e_\phi$ from the stick potentiometer 9 is subjected to multiplication by the constant $K_1$ in an amplifier or attenuator or the like 57 and the resultant voltage $K_1e_\phi$ is fed on line 58 to the summer 59, and it is also fed to a second multiplier device 60 and an integration circuit 61. Device 60 and circuit 61 provide a voltage $$-K_1K_2\int_0^t e_\phi dt$$

which is fed through a sign changing device 62 on line 63 to the summer and is also fed to a multiplier device 64 and integrator 65. Device 64 and integrator 65 derive a voltage equal to $$K_1K_2K_3\int_0^t \int_0^t e_\phi dt dt$$

which is supplied on line 66 to the summer. The summer output voltage $e_1$ is supplied on line 67 to detector 21 and the detector supplies, when energized, an output voltage $e_\delta$ to the transmitter 11 and to a multiplier device 68 and integrator 69. A voltage $$-K_4\int_0^t e_\delta dt$$

derived in device 68 and integrator 69 is supplied to summer 59 on line 70.

The output voltage from the summer on line 67 is, accordingly, $$e_1 = K_1e_\phi + K_1K_2\int_0^t e_\phi dt + K_1K_2K_3\int_0^t \int_0^t e_\phi dt dt - K_4\int_0^t e_\delta dt$$

Figure 7:
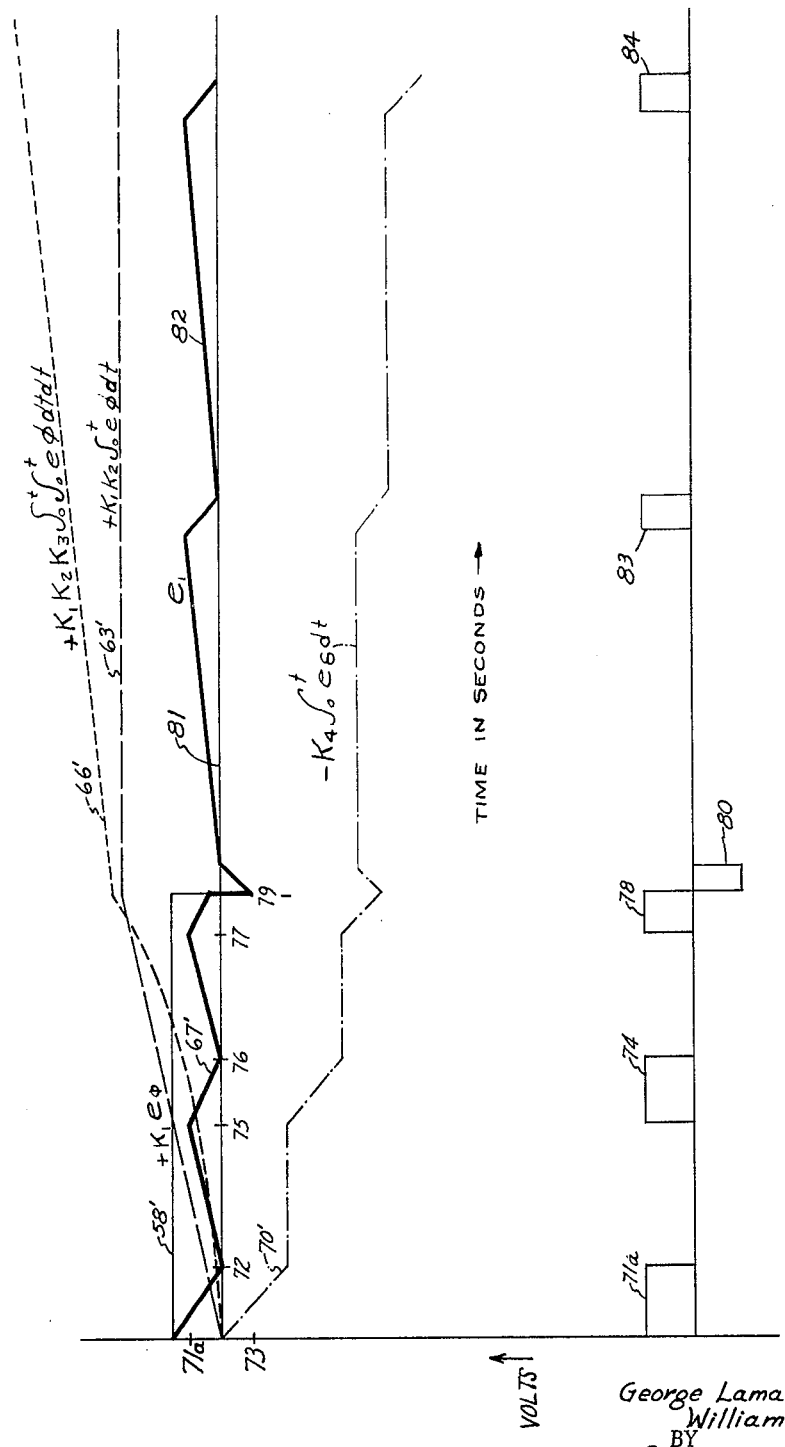
FIG. 7 is a graphical representation of voltages explanatory of the operation of the arrangement of FIG. 6.

The voltage $e_1$ and the several components thereof are represented in the graph of FIG. 7. As there shown, a voltage $K_1e_\phi$ is suddenly supplied by a stick displacement and this stick displacement is held constant until the stick is suddenly released. The stick voltage (multiplied by constant $K_1$) is seen at 58'. The application of a stick voltage greater in magnitude than the detector threshold value 71 causes the detector to become energized and to provide the constant value positive output voltage $e_\delta$ to the transmitter 11 and to device 68. A voltage $$-K_4\int_0^t e_\delta dt$$

as shown at 70', is, accordingly, derived and supplied to the summer degeneratively. This voltage increases negatively at a constant rate whenever the detector is energized in one direction, such as for up commands, and increases positively at the same rate for opposite energization of the detector, as for down commands.

The input voltage is, as explained, integrated against time to provide voltage $$+K_1K_2\int_0^t e_\phi dt$$

on line 63, as represented at 63'. And the first integral is again integrated in integrator 65 to provide a voltage $$+K_1K_2K_3\int_0^t \int_0^t e_\phi dt dt$$

on line 66, as represented at 66'. The summer output is represented by the curve 67'.

The detector remains energized to provide a positive output pulse 71a for an initial period, up to the time identified at 72, during which the voltage $e_1$ is being reduced from its initial value substantially above the threshold value to such less positive deenergization threshold value as may be selected. This lower threshold value is selected to be more positive than the negative energization threshold value 73 and, for convenience, and as representing a practical embodiment, is taken as zero. The lower threshold value for deenergization when the detector is negatively or oppositely energized is, of course, less positive, or more negative, than the positive energization threshold and is similarly taken at the exemplary value of zero.

The greater the initial voltage $K_1e_\phi$, the longer the first pulse, for, of course, the degenerative voltage 70' has more voltage to overcome. During this first pulse, the first integral $$K_1K_2\int_0^t e_\phi dt$$

builds up at a constant rate and being added to the input voltage requires that the degenerative feedback voltage increase negatively to a value somewhat greater than the initial positive voltage $K_1e_\phi$ before the summer output decreases to the deenergization threshold, zero volts.

Furthermore, the second integral $$K_1K_2K_3\int_0^t \int_0^t e_\phi dt dt$$

starts to build up and, being also added to the voltages which must be overcome by the degenerative feedback, further extends the length or width of the first pulse.

After the first pulse is ended, the summer output voltage 67' increases, in the absence of degenerative feedback, at a rate which, at first, may be only slightly greater than the rate of increase of the first integral, voltage 63, but which continuously increases as the second integral becomes greater and greater, increasing at an increasing rate, as seen at 66'.

Accordingly, the second pulse 74 will occur at a time 75 after a voltage build up from time 72 which is slower than the build up from time 76 at the end of the second pulse to time 77 at the start of the third pulse 78.

The rate at which the degenerative feedback overcomes the voltages 63 and 66 becomes less and less for succeeding pulses, because of the second integral voltage. Thus the downward slope of voltage 67' to time 72 is greater than the slope from time 75 to time 76, which is, in turn, greater than the slope from time 77 to time 79.

Accordingly, assuming the stick to be displaced and held in a fixed displaced position while a number of pulses are generated, the pulses will become closer and closer spaced and, after the first pulse, increasingly wide with the passage of time.

The system, in effect, remembers that the operator has been giving it up commands and, recognizing that up commands are still being called for by the operator, generates wider up command pulses at an increasing frequency.

With the stick deflected, the pulses which would follow pulse 74 would occur at ever increasing frequency, with less and less time between pulses, and each succeeding pulse would be wider and wider until 50% modulation or duty cycle is reached, and at this time the frequency decreases with increasing modulation, again being zero frequency or D.C. for 100% modulation, as the double integral voltage on line 66 increased at an ever increasing rate. The system will eventually reach a point at which the sum of the voltages on lines 63 and 66 are increasing at a rate sufficient to be not overcome by the degenerative feedback voltage on line 70, whereupon the detector would remain energized and would not pulse off, until the stick was moved to give a check command or an opposite command.

The double integral system of FIGS. 6 and 7 "remembers" what commands the operator gave before a centering of the stick, and, based on those commands, generates further commands after the stick has been centered which, in practice, permits the system to automatically correct for gravity and any other acceleration error, thus freeing the operator from a continuing burden which he would otherwise have to give commands to correct for such effects. The operator's first commands give the system the information by means of which it thereafter generates pulses appropriate to correct for gravity, for example. The operator thereafter, through small movements of the stick from its centered position trims up the missile flight path.

With specific reference to FIG. 7, if the stick is suddenly centered at the time 79, the summer output voltage 67' is driven negatively beyond the negative energization threshold value 73. As the summer output voltage reaches zero, the detector will become deenergized, if, as shown, it has been in energized condition, and when the voltage reaches the negative energization threshold value 73, the detector will initiate a negative pulse, as seen at 80.

With the stick now centered, $K_1 e_\phi$ becomes zero, and no longer is there an increasing voltage $$K_1 K_2 \int_0^t e_\phi dt$$

It will be seen that curve 63' in FIG. 7 becomes horizontal at point 79. On the other hand, the components 60, 61 for deriving this first integral serve now as a source, not of an increasing, but of a constant voltage for the integrator 65. As shown in the graph of FIG. 7, following the time 79, the voltage 66' increases as a second order function, that is, as the second integral, up to time 79 and that it thereafter increases as a first order function. After time 79, the voltage represented by curve 66' is the first integral of the now constant voltage supplied by the integrator 61 of FIG. 6. The first integral voltage now provided on line 66 to the summer will result in the detector continuing thereafter to produce pulses of the same polarity as pulses produced before centering of the stick but at a constant repetition rate. The value of $K_3$ is, in this missile control system, much lower than the value of $K_2$, whereby the voltage 66' after time 79 increases only slowly and the upward slope of the summer output voltage as seen at 81 and 82 between pulses 80 and 83 and between pulses 83 and 84 will be much less than the slope such as between times 76 and 77 prior to the time 79. The pulses after time 79 are of less width, since the voltage to be bucked out by the degenerative voltage $$K_4 \int_0^t e_\delta dt$$

increases less during the occurrence of each pulse, and the pulses occur at a much lower repetition rate.

The pulse width and repetition rate following the centering of the stick will depend upon the length of time the stick was deflected prior to centering thereof, being less for short periods of deflection and greater for longer periods of deflection.

The operator, then, in the missile control system described, might note shortly after launch that the missile was flying, for example, below the target and he would pull back on the stick 3 to originate an up command, resulting in the production of a first wide up or positive pulse 71 having a width in proportion to the extent of the stick deflection. So long as the deflection was continued, the system would generate a train of pulses, such as pulse 74, at increasing frequency and of increasing widths. As the missile approached the line of sight, the operator would release the stick and a check command pulse 80, of which the width would, appropriately, bear a direct relation to the extent of original stick deflection, would be generated by the system to reduce or, ideally, to exactly overcome the velocity of the missile in the up direction, with respect to the line of sight.

If the original departure of the missile from line of sight was small, as might be the case if gravity had a small downward effect on the missile, the stick would be deflected for only a short time before the missile would approach the line of sight, and, after the stick was then released and centered, the system would generate narrow, widely spaced pulses 83, 84 which would be sufficient to at least substantially compensate for the gravity force. If, on the other hand, gravity had a greater effect on the missile flight path, the error signal generated by the operator's deflection of the stick would be greater and would continue for a longer period, and after release of the stick, the pulses 83, 84 would recur more frequently and be of greater width than for the case with less gravity effect.

It will be understood that right or left commands might be given to correct for windage, for example, and that the system would respond in a manner similar to that described above.

In a bang bang system, it has been found that the operator, if he has direct control of spoilers, for example, has difficulty since he tends to think and respond in linear terms but is able to produce only accelerations in the missile. According to the present system, acceleration commands to the missile are linear with stick movements and the controller, from stick to transmitter, acts as the linearizing element in this bang bang missile control system. The detector having non-linear hysteresis dead band characteristics, as described, generates a pulse train as a result of a linear error signal, such as that described as produced by a linear stick movement.

If the system being controlled is in a highly undamped state, the operator will use rapid motions of the stick, such as are assumed in FIGS. 5 and 7, creating a predominance of the pulse stretching and check command feature, and causing the device automatically to generate stabilizing commands.

While for such rapid stick motion the pulse stretching and check command feature will predominate over the trim effect, when the system being controlled becomes damped, after several commands have been given, the operator no longer has to use rapid stick movements, and the trim effect then predominates over the check command feature because of the slow changes in operator input.

Referring to FIG. 7 if the stick movement was slow, rather than abrupt as shown, the voltage 58' would gradually increase until it, plus still small components of integral voltages, would reach the triggering value 71 for the detector prior to the completion of the stick movement. An output pulse would be thus initiated which would continue for a period shorter than that which is shown at 71 as resulting from a rapid stick movement. The summer output voltage $e_1$ would not yet be at a high value and would be relatively rapidly reduced by the degenerative feedback. There is a relatively smaller original input voltage built up at the input to the summer than in the case shown in FIG. 7, for example.

The slow stick movement, accordingly, when compared with rapid stick movement, provides shorter initial pulses, having less immediate control effect on the missile for example, but, subsequently, substantially the same pulse train as would be produced by a rapid stick displacement such as in FIG. 5 or FIG. 7, dependent upon the magnitude of the stick displacement angle $\phi$ and the period during which the displacement continues.

Figure 8:
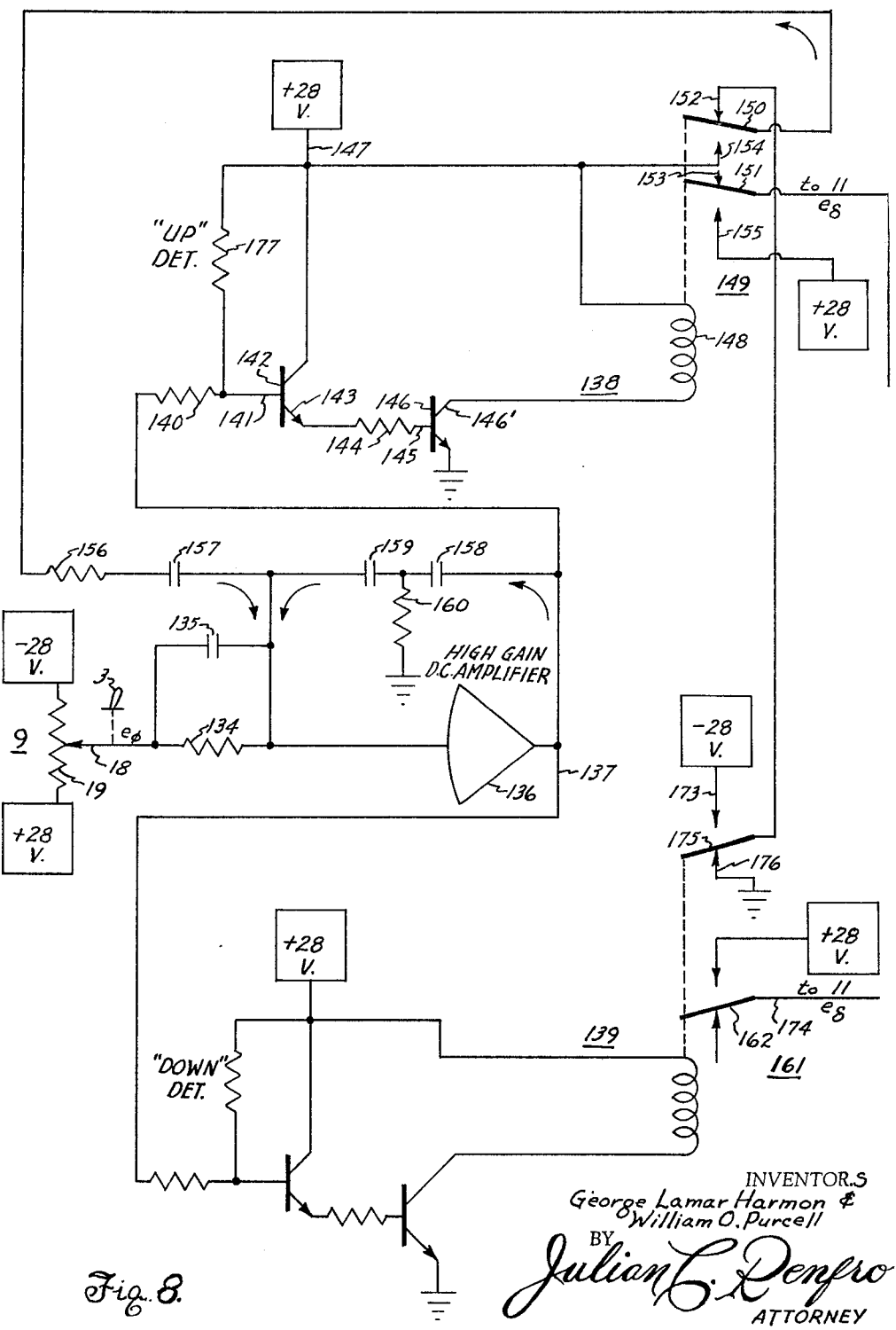
FIG. 8 is a schematic diagram of a practical embodiment of the system shown in FIG. 6.

Turning now to the specific embodiment of the invention shown schematically in FIG. 8, a voltage $e_\phi$ is provided on slider 18 engaging potentiometer resistance 19, under the control of the pilot or operator. This voltage is applied through resistor 134 and parallel capacitance 135 to the input of high gain D.C. amplifier 136. The output of the amplifier is supplied through connection 137 to dead band detectors 138 and 139 which correspond to the comparator 29 of FIG. 3. These two detectors, of which detector 138 is an "up" detector and detector 139 is a "down" detector, can be considered as two half wave detectors or one full wave detector or a voltage comparator, but in each case, the detector is an on-off device having two stable conditions for each half wave device. Specifically, as to detector 138, the voltage on conductor 137 is fed through a resistor 140 to the base 141 of a transistor 142, the emitter 143 of which is connected through resistor 144 to the base 145 of transistor 146. The voltage appearing on base 145 controls the current flow from positive voltage supply conductor 147 through coil 148, of relay 149, the coil being connected to collector 146' of the transistor 146. When energizing current flows through coil 148, armatures 150 and 151 break their respective contacts 152 and 153 and make contact at 154 and 155, respectively. The circuit parameters of detector 138 are so chosen that, typically, with zero voltage on conductor 137, the coil receives less than enough current to hold in the relay armatures, whereas a voltage of $+1$ v. will cause the relay to pick up.

The voltage appearing at conductor 137 is proportional to the sum of the input voltage $e_\phi$ appearing on slider 18 plus a voltage proportional to the rate of change of slider voltage and a voltage proportional to the rate of change of the rate of change of slider voltage, as previously explained, and added to these voltages, whenever an output pulse is being produced, is a bucking or degenerative feedback voltage. The degenerative voltage appears on armature 150 and is fed back through resistor 156 and capacitor 157 to the input of amplifier 136. The passive network, comprising capacitors 158 and 159 in series and resistor 160 connected from the juncture of these capacitors to ground, constitutes a regenerative network which is fed from the output of amplifier 136.

The potentiometer as shown may be connected to a plus and minus 28 volt source, and 28 volts positive may be supplied to conductor 147 of the detector and 28 volts negative may be supplied to the terminal 173 of relay 161 of detector 139. To produce up command pulses, the slider 18 is moved toward the minus voltage end of the potentiometer which produces a positive voltage on conductor 137 in the circuit shown in FIG. 8. If the voltage at 137 exceeds one volt positive, relay 149 pulls in, and a positive voltage is supplied from terminal 154 and armature 150 through resistor 156 and capacitor 157 to the amplifier which, accordingly, reduces the negative voltage at the amplifier input. The voltage fed back is normally sufficient to overcome the input voltage and thus to cause cycling.

The "down" detector 139 is identical to detector 138 with the exceptions that it is so biased that its relay 161 is normally energized and its relay armature contacts are differently connected. At zero voltage on line 137, accordingly, relay 149 is in dropped out condition and relay 161 is pulled in. A positive voltage on line 137 of greater than the predetermined threshold value of about $+1$ v. will cause relay 149 to pull in. Thereafter, if the voltage drops toward zero, relay 149 remains pulled in until the lower threshold voltage, such as 0 v., is reached. It will be understood that such operation would be typical of solenoid type mechanical relays having appreciable or substantial hysteresis characteristics, or of, comparable electronic relays or flip-flop circuits. Relay 161 would remain pulled in until the voltage at 137 reached $-1$ v., the upper threshold value for this circuit, at which time relay 161 would drop out and supply an output voltage, of, typically, 28 v. on armature 162. Relay 161 would then remain dropped out until the negative voltage on conductor 137 decreased to the lower threshold for circuit 139, which is 0 v. in this typical case.

It will be apparent that a positive voltage $e_\phi$ will produce a negative voltage at conductor 137 which, if it exceeds $-1$ v. will cause relay 161 to drop out, whereby an output voltage $e_\delta$ will appear on conductor 174 to be supplied to transmitter 11, there to produce a down command for the missile, and, at the same time, a negative voltage will be supplied from terminal 173 through armature 175 to terminal 152 of relay 149, and thence through the negative feedback resistor 156 and capacitor 157 in a direction to reduce the positive voltage at the input to the amplifier 136, and this continues until the voltage at conductor 137 becomes zero, whereupon relay 161 again picks up grounding armature 175, through contact 176, and opening the output circuit to conductor 174. Detector 139 thereafter cycles to produce a train of down pulses in a manner similar to the cycling of the up detector.

In a system as shown in FIG. 8, typical component values, with a D.C. amplifier 136 having a gain $10^8$, would be as follows:

| | | |
|---|---|---|
| Resistor 134 | meg | 18 |
| Capacitor 135 | mfd | 0.5 |
| Resistor 156 | meg | 2 |
| Capacitor 157 | mfd | 0.5 |
| Capacitor 158 | mfd | 1.1 |
| Capacitor 159 | mfd | 1.1 |
| Resistor 160 | meg | 0.51 |

The voltage on conductor 137 would, typically, range from about $-20$ v. to about $+20$ v., while detector or flip-flop circuit 138 would operate to pick up relay 149 at about $+1$ v. and to drop out relay 149 at about 0 v. on conductor 137. The relay detector 139 operates to drop out relay 161 at an upper threshold voltage of $-1$ v. and to pull in relay 161 at a lower threshold voltage of 0 v.

The value of series resistor 140 in the input to detector 138 primarily determines the difference in the threshold voltages at conductor 137 necessary to cause relay 149 to pull in and drop out, while resistor 177, connected between voltage source 147 and the transistor base 141, determines the value of the voltages at 137 necessary to pull in and drop out of the relay. These, and other circuit parameters, are selected to provide for cycling at a rate which, for the narrowest pulses, yields pulses of sufficient width to permit the completion of a control function. That is, if it requires a pulse of at least one tenth of a second to cause actuation of a spoiler on the missile being controlled, the system should be arranged to produce no pulses of less than one-tenth of a second duration or width.

The arrangement of this invention may be aptly considered to comprise an adaptive controller particularly adapted to the control of a command guided missile. Unlike certain prior art controllers, the system is capable of providing variable width pulses at varying repetition rates, or frequency, in a pulse train of which the duty cycle is proportional to or a function of the deflection of a control stick. The components of the system function together somewhat in the manner of a special purpose oscillator controlled by the operator's inputs, and including regenerative feedback effective to maintain an output under appropriate conditions in the absence of operator input. The system provides check commands upon release of or reverse operation of the control stick relieving the operator of the necessity of following commands with opposite commands. The system generates appropriate output, based upon previously given operator commands, to bias out gravity, windage and other similar effects, thereby reducing the operator's task, after a short period of control by the operator, to the giving of only trim up commands. The system is thus capable of remembering past history and of generating output automatically to accord with what the system has learned from previous operator commands. In addition to having value in manually controlled systems, the concepts of this invention, as will be apparent to those skilled in the art, are applicable to automatic systems.

Accordingly, while only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a control system comprising a source of voltage varied to initiate commands, means to integrate against time the voltage from said source, a triggered pulse producing circuit having two stable conditions and being operable from a first to a second condition in response to application thereto of a voltage exceeding a first threshold value and from said second to said first condition in response to application thereto of a voltage less than a second threshold value which is less than said first threshold value, summing means for adding said source voltage to the integral thereof from said integrating means and for supplying a voltage comprising the resultant sum voltage to said pulse circuit operative to trigger said circuit from its said first to its said second condition, means responsive to occurrence of said second condition in said pulse producing circuit to produce and supply a negative feedback voltage to said summing means of sufficient magnitude to reduce the voltage supplied to said pulse producing circuit until the voltage so supplied thereto falls below said second threshold value.

2. In a pulse generating system, a D.C. voltage divider potentiometer having a movable slider, a voltage summer, means to supply the voltage on said slider to said summer, means to integrate the voltage on said slider against time and to supply the time integral voltage to said summer additive with said slider voltage, a circuit having first and second stable conditions and operable from its first to its second stable condition in response to application thereto of a voltage exceeding a first threshold value and from said second to said first condition upon reduction in the applied voltage to a value less than a second lower threshold value, said threshold voltage values being within the range of voltages appearing on said slider, means connected to said circuit responsive to one of said conditions to supply an output voltage, an integrating network, means supplying a constant D.C. voltage to said network while said circuit is in its said second condition, means to supply the integrated voltage produced in said network to said summer degeneratively to reduce said voltages additive therein operative to reduce the voltage from said summer to less than said second threshold value, whereby said circuit is operated into its said first condition until in response to an increase of voltage on said slider it operates to said second condition and remains in said second condition for a length of time determined in part by the value of the slider voltage and thereafter cycles between said conditions.

3. In a control system for receiving command input voltages and for providing output signals related to said input voltage, means for deriving a first voltage proportional to said input voltage and a second voltage proportional to the integral of said first voltage and a third voltage proportional to the integral of said second voltage, means for summing said first, second and third voltages, means connected to receive said summed voltages and responsive to occurrence of a predetermined magnitude thereof to produce an output signal, and means for deriving a fourth voltage proportional to the time integral of such output signal and for subtracting said fourth voltage from said summed voltages effective to reduce the net voltage received by said output signal producing means during production thereby of said output signal.

4. Means for generating voltage pulses $e_\delta$ in response to a command voltage $e_\phi$ comprising a comparator operative in response to reception of a voltage $e_1$ exceeding a predetermined threshold value to produce an output voltage $e_\delta$ until the received voltage $e_1$ falls to a value less than a second lower threshold value and thereafter to discontinue the production of an output voltage pending subsequent receipt of a voltage $e_1$ exceeding said first predetermined threshold value, and integrating and summing means connected to receive said voltages $e_\phi$ and $e_\delta$ and connected to said comparator to supply thereto a voltage $e_1$ equal to $$K_1 e_\phi + K_2 \int_0^t e_\phi dt + K_3 \int_0^t \left[ \int_0^t e_\phi dt \right] dt - K_4 \int_0^t e_\delta dt$$

wherein $K_1$, $K_2$, $K_3$ and $K_4$ are constants.

5. The means as defined in claim 4 wherein the first threshold value is much less than the maximum value of $K_1 e_\phi$ and wherein the maximum value of $$K_4 \int_0^t e_\delta dt$$

exceeds the maximum value of $$K_1 e_\phi + K_2 \int_0^t e_\phi dt + K_3 \int_0^t \int_0^t e_\phi dt dt$$

6. Means for generating voltage pulses $e_\delta$ in response to a command voltage $e_\phi$ comprising a comparator operative in response to reception of a voltage $e_1$ exceeding a predetermined threshold value to produce an output voltage $e_\delta$ until the received voltage $e_1$ falls to a value less than a second lower threshold value and thereafter to discontinue the production of an output voltage pending subsequent receipt of a voltage $e_1$ exceeding said first predetermined threshold value, and integrating and summing means connected to receive said voltages $e_\phi$ and $e_\delta$ and connected to said comparator to supply thereto a voltage $e_1$ equal to $$K_1 e_\phi + K_2 \int_0^t e_\phi dt - K_4 \int_0^t e_\delta dt$$

wherein $K_1$, $K_2$ and $K_4$ are constants.

7. Means for selectively generating output voltage pulses $e_\delta$ of respectively opposite polarities in response to positive and negative command voltages $e_\phi$ comprising a full wave comparator operative in response to reception of a voltage $e_1$ exceeding a predetermined positive threshold value to produce an output voltage $e_\delta$ of one polarity until the received voltage $e_1$ decreases to a second predetermined value less positive than said threshold value and thereafter to discontinue the production of such output voltage $e_\delta$ of said one polarity pending subsequent receipt of a positive voltage $e_1$ exceeding said threshold value and operative in response to reception of a voltage $e_1$ exceediing a predtermined negative threshold value more negative than said second predetermined value to produce an output voltage $e_5$ of polarity opposite to said one polarity until the received voltage $e_1$ decreases to a fourth predetermined value less negative than said negative threshold value and less positive than said positive threshold value pending subsequent receipt of a negative voltage $e_1$ exceeding said negative threshold value, and integrating and summing means connected to receive said voltages $e_\phi$ and $e_5$ and connected to said comparator to supply thereto a voltage $e_1$ equal to $$K_1 e_\phi + K_2 \int_0^t e_\phi dt - K_4 \int_0^t e_5 dt$$

wherein $K_1$, $K_2$ and $K_4$ are constants.

8. A controller for delivering a plurality of output voltage pulses which reflect the direction in which a control element is moved, and of which the widths and repetition rates are functions of the existing position of said element as well as the previous positions of said element and of the speeds of movement of said element comprising, an amplifier, a detector, means controlled by said control element for furnishing input voltages corresponding to the position thereof, passive network means for deriving first and second order functions of said input voltages and for supplying the sum thereof to said detector, said detector providing a first predetermined output voltage in response to application thereto of a voltage exceeding a predetermined threshold level but providing zero output voltage when said applied voltage decreases to a predetermined value less positive than said threshold level, said detector also providing a second predetermined output voltage in response to application thereto of a voltage less positive than a second predetermined threshold level which is less positive than said predetermined value but providing zero output voltage when said applied voltage increases to a second predetermined value between said threshold levels, a passive degenerative feedback network for deriving and adding degeneratively to said sum, when said first predetermined output voltage is being produced, a first order function thereof of sufficient magnitude and of a polarity to reduce the voltage to said detector to said first predetermined value and, when said second predetermined output voltage is being produced, a first order function thereof of sufficient magnitude and of polarity to increase the voltage to the detector to said second predetermined value, whereby said detector oscillates responsive to such input voltages at rates determined by said functions, thereby to provide a train of such output voltage pulses.

9. In a control system comprising a detector having respective excited and unexcited conditions and being operable by a voltage applied to the input of the detector exceeding a first threshold value into said excited condition and by a voltage less than a lower predetermined value into said unexcited condition, means for receiving a control voltage and for deriving and applying to said detector input an integral function thereof whereby to cause said detector to become excited, and means responsive to the excited condition of said detector to generate a voltage increasing with time and to apply said voltage degeneratively to said detector input whereby to buck said integral function and cause said detector to become unexcited.

10. In a control system, means for producing an input signal, means for deriving first and second integrals of said input signal, means for producing an output signal, means for integrating said output signal to produce a degenerative feedback signal, means for adding said input signal and the integrals thereof as well as said degenerative feedback signal to provide a composite signal, and means connected to be triggered by said composite signal to provide said output signal when said composite signal is above a certain value.

11. The control system as defined in claim 10 in which said means for producing a degenerative feedback signal generates none when said output is zero, thereby allowing the integrals of said input signal to cause said composite signal to increase to the value necessary for said output means to produce an output, said output being produced until a degenerative output signal is again derived, which thereafter brings about the inoperative condition of said output means.

12. In a control system, manually controlled means for producing a first signal, means for deriving first and second integrals of said first signal, means for deriving a degenerative feedback signal, means for adding said first signal, the integrals of said first signal, and said degenerative feedback signal to provide a composite signal, output means connected to be triggered by said composite signal, said output means having a predetermined upper threshold trigger value and a predetermined lower threshold trigger value and being triggered to an operative condition when said composite signal exceeds said upper threshold trigger value, said output means producing an output signal when in its operative condition, and means for producing from the output signal said degenerative feedback signal, said output means becoming inoperative to produce said output signal when said composite signal as a result of said degenerative feedback signal decreases to a valve lower than said predetermined lower thereshold value.

13. The control system as defined in claim 12 in which as a result of said output signal going to zero said means for deriving a degenerative feedback signal produce a zero output, said composite signal thereafter increasing to a value corresponding to said upper threshold trigger value, thereby to again bring about the operative condition of said output means, a degenerative feedback signal again being created from said output signal that again turns off said output means, with the operation of said output means thereafter being oscillatory.

References Cited by the Examiner

UNITED STATES PATENTS

| 2,259,600 | 10/1941 | Alkan | 343—117 |
| 2,779,869 | 1/1957 | Gerks | 328—150 X |
| 2,959,347 | 11/1960 | Kearns | 244—14 |
| 2,967,019 | 1/1961 | Turtora | 343—117 |
| 3,012,180 | 12/1961 | Finvold | 318—457 X |
| 3,168,264 | 2/1965 | Sendles | 244—14 X |

NEIL C. READ, *Primary Examiner.*

KATHLEEN H. CLAFFY, *Examiner.*

A. J. KASPER, *Assistant Examiner.*